No. 789,557.

Patented May 9, 1905.

UNITED STATES PATENT OFFICE.

ACHILLE MEYGRET, OF PARIS, FRANCE.

PROTECTIVE SHEATH OR ENVELOP FOR STORAGE-BATTERY PLATES.

SPECIFICATION forming part of Letters Patent No. 789,557, dated May 9, 1905.

Application filed May 9, 1904. Serial No. 207,164.

*To all whom it may concern:*

Be it known that I, ACHILLE MEYGRET, a citizen of the Republic of France, residing at Paris, in the Department of the Seine, France, have invented a certain new and useful Improvement in Protective Sheaths or Envelops for Storage-Battery Plates, of which the following is a specification.

It is well known that in the use of storage-battery plates the life of such plates is shortened to a greater or less extent by reason of the active material thereon becoming loosened and detached, thus falling off or dropping from the metal portion of the plate or grid. This loosening and detachment of the active material from the metal body of the plate or grid arises from the fact that the active material will dilate or expand and contract under the repeated acts of charging and discharging the battery, and for the reason that the elasticity of the active matter or material is very limited the dilation or expansion and contraction thereof will cause it to loosen and in time detach itself and drop or fall off, thus deteriorating or destroying the plate as a whole to a degree where the required functions will not be performed.

The object of the present invention is to incase or surround the plate or grid, with the active matter or material thereon, with a sheath or envelop by which the effects of charging and discharging the battery will not cause the active matter or material to become loosened and detach itself and drop off from the metal body of the plate or grid, the sheath or envelop being of a flexible nature, so as to give and take without destroying its integrity as a protection against the loosening of the active matter or material, and being also of a nature that the electrolyte will not affect it and destroy its efficiency in preventing the electrolyte from coming in direct contact with the metal of the plate or grid. The sheath or envelop thus prevents the active material or matter from becoming loosened and dropping off and also protects the metal of the plate or grid from direct contact with the electrolyte, thus increasing or prolonging the life of the battery-plate, more particularly that part thereof not covered by the active material as a whole by retaining the active matter or material in place and keeping the electrolyte from attacking the metal.

The invention consists in the protective sheath or envelop for storage-battery plates, hereinafter described and claimed.

The protective sheath or envelop of the present invention is applied by dipping the plate or grid when complete with the active matter or material thereon in a bath or solution consisting of castor-oil, pyroxylin, and flexible collodion. This bath or solution is formed by bringing together into the solution of castor-oil and flexible collodion the pyroxylin, preferably in the form of a jelly, for the three elements when mixed to furnish a solution which when the plate or grid with the active material thereon is dipped thereinto will form a close-fitting coating or sheath that draws and braces the active matter or material against the supporting surfaces or faces of the metal part of the plate or grid, thus positively and effectively preventing the detachment, falling off, or dropping away of the active matter or material from the plate.

The coating, envelop, or sheath, consisting of the ingredients named brought together in proper proportion, is of an elastic nature and possesses the property of not being attacked by the electrolyte, so that when applied the electrolyte will be prevented from coming in direct contact with the metal of the plate or grid, thereby prolonging the life of the battery-plate as a whole. It is necessary, however, for the operation of the battery-plate that the electrolyte should reach the active matter or material, and for this purpose the envelop or sheath of castor-oil, pyroxylin, and flexible collodion should be rendered porous or given porosity. This can be done either by mechanical means or chemically, so as not to destroy the envelop or sheath as a protector in holding the active matter or material on the supporting surfaces or faces of the plate or grid in case of loosening and at the same time allow the required contact of the electrolyte and the active matter or material for charging and discharging purposes. The envelop or sheath can be given the porosity required mechanically by passing the plate, with the envelop or sheath applied thereto, under a cylinder or between cylinders having points or cutters that will finely perforate or slit the envelop or sheath without destroying its continuity and furnish a multiplicity of fine perforations, slits, or gashes that will allow access of the electrolyte to the active matter or material without presenting the metal of the plate or grid to the direct contact of the electrolyte.

This envelop or sheath, consisting of castor-oil, pyroxylin, and flexible collodion in a solution, is applicable to and is adapted for use with any form or type of storage-battery plates or electrodes. It is of a flexible nature that will yield to permit of the dilation or expansion and contraction of the active matter or material without having its retaining properties as an envelop or sheath destroyed or impaired. It furnishes a binder by which the active matter or material will not become detached readily and if detached will be held from dropping off or falling from the plate or grid. It is capable of use and can be used with storage-battery plates or electrodes of large or small size, as may be required or necessary for commercial purposes. It is specially applicable to a thin metal plate or grid with active matter or material thereon, as it enables such plate or grid to be used with the positive assurance that the active matter or material will be retained on the plate, thus enabling the plate to be made very light and not heavy and cumbersome, and storage-battery plates or electrodes protected by the porous envelop or sheath, consisting of castor-oil, pyroxylin, and flexible collodion in solution, will be conserved or maintained in working condition for a long period of time and the longevity of the plate will be greatly increased, with the result of a saving in the renewal of the battery-plates.

This envelop or sheath, consisting of the ingredients named and applied in solution to the plate having the active matter or material thereon, furnishes the required protection for the active matter or material against detachment and dropping off from the elastic nature of the sheath or envelop, which serves to draw the active matter or material close to the grid, insuring a snug fit and close contact between the active matter or material and the metal part of the plate or grid and protecting against the parts of the metal grid not covered by the active material, such as the edges of the top and body portions of the metal plate or grid.

It is evident that other means of applying the coating than by dipping the plate in the solution can be employed—as, for instance, the solution can be applied by means of a brush or other suitable appliance—so long as the plate or grid is completely incased or enveloped with the solution to furnish a protective covering for the active material. The envelop or sheath can be given porosity by other mechanical means than a cylinder or cylinders suitable for the purpose, as by cutting a series of fine gashes in the envelop or sheath with a knife or other instrument that will make fine slits to furnish the necessary porosity.

What I regard as new, and desire to secure by Letters Patent, is—

A coating or sheath for retaining the active material on the plate of a storage battery, said coating or sheath consisting of a mixture of castor-oil, pyroxylin and flexible collodion, substantially as described.

ACHILLE MEYGRET.

Witnesses:
CHAS. H. WHITING,
T. NIEDEREHE.